(12) United States Patent
Gardynik et al.

(10) Patent No.: US 11,421,462 B2
(45) Date of Patent: Aug. 23, 2022

(54) BUMP STOP ASSEMBLY FOR MOTOR VEHICLE

(71) Applicant: Ford Global Technologies, LLC, Dearborn, MI (US)

(72) Inventors: Michael J. Gardynik, Farmington Hills, MI (US); Mark Joseph Courtright, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 17/078,810

(22) Filed: Oct. 23, 2020

(65) Prior Publication Data

US 2022/0127892 A1    Apr. 28, 2022

(51) Int. Cl.
*E05F 5/02* (2006.01)
*B62D 25/12* (2006.01)

(52) U.S. Cl.
CPC .............. *E05F 5/022* (2013.01); *B62D 25/12* (2013.01)

(58) Field of Classification Search
CPC ..... E05F 5/022; B62D 25/12; E05Y 2600/53; E05Y 2900/536

USPC .......................................................... 296/207
See application file for complete search history.

(56) References Cited

U.S. PATENT DOCUMENTS

| 4,653,968 | A | * | 3/1987 | Rapata ................... E05F 5/022 |
| | | | | 248/188.4 |
| 7,575,273 | B2 | | 8/2009 | Wallman et al. |
| 7,690,722 | B2 | | 4/2010 | Boggess |
| 9,410,354 | B2 | * | 8/2016 | Nakasone ................. E05F 5/02 |
| 10,150,444 | B1 | | 12/2018 | Schwalm et al. |
| 10,821,933 | B2 | * | 11/2020 | Hammer ............ B60R 13/0838 |
| 2006/0064845 | A1 | | 3/2006 | Fujii et al. |
| 2017/0096119 | A1 | * | 4/2017 | Gardynik ................ E05F 5/022 |
| 2019/0055769 | A1 | * | 2/2019 | Davis ..................... B62D 25/12 |

FOREIGN PATENT DOCUMENTS

EP    3150446 A1    4/2017

* cited by examiner

*Primary Examiner* — Pinel E Romain
(74) *Attorney, Agent, or Firm* — Vichit Chea; Carlson, Gaskey & Olds, P.C.

(57) ABSTRACT

This disclosure relates to a bump stop assembly for a motor vehicle. An example assembly includes a head configured to contact a hood of the motor vehicle when the hood is closed, a shaft, and a base configured to fit in an opening in a panel of the motor vehicle. The shaft supports the head relative to the base. Further, the base includes a notch configured to provide a fracture location of the base.

20 Claims, 5 Drawing Sheets

BUMP STOP ASSEMBLY FOR MOTOR VEHICLE

TECHNICAL FIELD

This disclosure relates to a bump stop assembly for a motor vehicle.

BACKGROUND

Motor vehicles are known to include one or more bump stop assemblies which are configured to prevent contact between a hood of the vehicle, when closed, and a panel of the engine bay of the vehicle. Known bump stop assemblies include a head, a threaded shaft, and a base receiving the shaft. The head is configured to directly contact the hood, and the shaft is configured to adjust a position of the head relative to the base. Some known bump stop assemblies are configured to breakaway (i.e., they are frangible, or are configured to fracture) in response to a relatively large applied load.

SUMMARY

A bump stop assembly for a motor vehicle according to an exemplary aspect of the present disclosure includes, among other things, a head configured to contact a hood of the motor vehicle when the hood is closed, a shaft, and a base configured to fit in an opening in a panel of the motor vehicle. The shaft supports the head relative to the base. Further, the base includes a notch configured to provide a fracture location of the base.

In a further non-limiting embodiment of the foregoing assembly, the notch is a V-shaped groove.

In a further non-limiting embodiment of any of the foregoing assemblies, the notch is open facing the hood.

In a further non-limiting embodiment of any of the foregoing assemblies, the notch is open facing the panel.

In a further non-limiting embodiment of any of the foregoing assemblies, the base includes a main body portion and a flange, and the notch is in the flange.

In a further non-limiting embodiment of any of the foregoing assemblies, in a normal operating condition, the flange is configured to prevent movement of the bump stop assembly relative to the panel in a downward direction, and, in an applied load condition, the flange is configured to fracture adjacent the notch and permit movement of the bump stop assembly relative to the panel in the downward direction.

In a further non-limiting embodiment of any of the foregoing assemblies, the notch circumscribes a main body portion of the base.

In a further non-limiting embodiment of any of the foregoing assemblies, the flange includes two notches on opposite sides of a main body portion of the base.

In a further non-limiting embodiment of any of the foregoing assemblies, the notch includes an apex arranged vertically above a perimeter of the opening in the panel.

In a further non-limiting embodiment of any of the foregoing assemblies, the notch includes an apex arranged inward of a perimeter of the opening in the panel.

In a further non-limiting embodiment of any of the foregoing assemblies, the base includes two cantilevered arms projecting from opposite sides of a main body portion of the base.

In a further non-limiting embodiment of any of the foregoing assemblies, the base includes a central bore, the central bore is at least partially threaded, the shaft is at least partially threaded and engages threads of the central bore such that rotation of the shaft adjusts a vertical position of the head relative to the panel.

A motor vehicle according to an exemplary aspect of the present disclosure includes, among other things, a hood configured to open and close relative to an area of the motor vehicle, a panel within the area, and a bump stop assembly within the area. The bump stop assembly includes a head configured to contact the hood when the hood is closed, a shaft, and a base configured to fit in an opening in the panel. The shaft supports the head relative to the base. Further, the base includes a notch configured to provide a fracture location of the base.

In a further non-limiting embodiment of the foregoing vehicle, the area is an engine bay of the motor vehicle.

In a further non-limiting embodiment of any of the foregoing vehicles, the notch is a V-shaped groove.

In a further non-limiting embodiment of any of the foregoing vehicles, the notch is either open facing the hood or the panel.

In a further non-limiting embodiment of any of the foregoing vehicles, the base includes a main body portion and a flange, and the notch is in the flange.

In a further non-limiting embodiment of any of the foregoing vehicles, in a normal operating condition, the flange is configured to prevent movement of the bump stop assembly relative to the panel in a downward direction, and, in an applied load condition, the flange is configured to fracture adjacent the notch and permit movement of the bump stop assembly relative to the panel in the downward direction.

In a further non-limiting embodiment of any of the foregoing vehicles, the notch circumscribes a main body portion of the base.

In a further non-limiting embodiment of any of the foregoing vehicles, the flange includes two notches on opposite sides of a main body portion of the base.

DETAILED DESCRIPTION

This disclosure relates to a bump stop assembly for a motor vehicle. An example assembly includes a head configured to contact a hood of the motor vehicle when the hood is closed, a shaft, and a base configured to fit in an opening in a panel of the motor vehicle. The shaft supports the head relative to the base. Further, the base includes a notch configured to provide a fracture location of the base. This disclosure has a number of other benefits which will be appreciated from the following description. Among them, this disclosure achieves a good balance of adequately supporting the bump stop assembly while also permitting the bump stop assembly to breakaway in response to a relatively large applied load. Further, the bump stop assembly is robust, compact, relatively easily manufactured and assembled, and provides aesthetic appeal.

Figure 1:
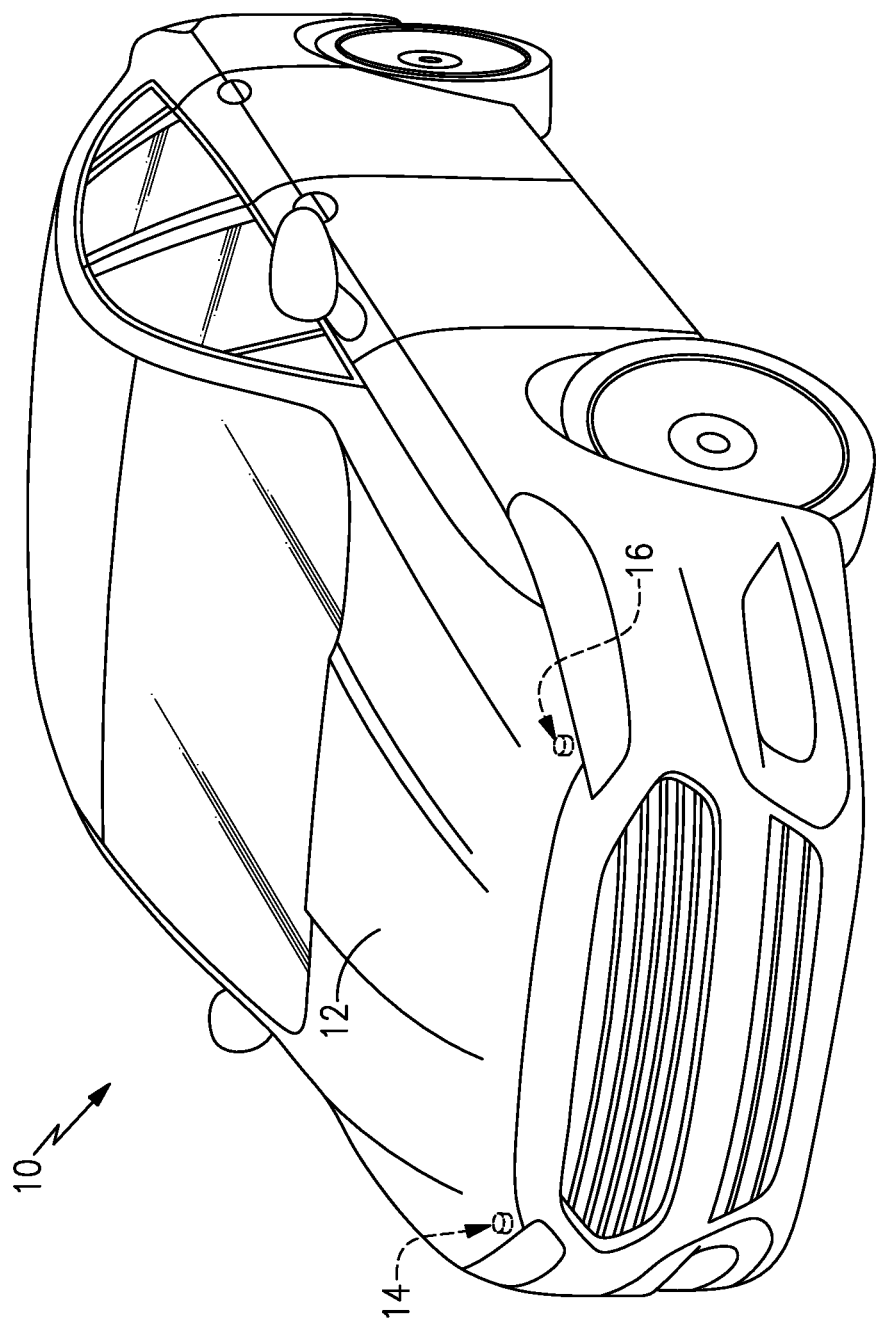
FIG. 1 is a front perspective view of a vehicle including two example bump stop assemblies.

FIG. 1 is a perspective view of an example motor vehicle 10 ("vehicle 10"). The vehicle 10 includes a hood 12, which is configured to rotate to selectively cover and uncover an area of the vehicle 10, such as an engine bay. The hood 12 could be used to selectively cover and uncover other areas of a vehicle, such as a frunk, as examples. In this respect, the vehicle 10 could be an electrified vehicle, such as a battery electric vehicle (BEV), or another type of vehicle. In FIG. 1, the vehicle 10 includes an internal combustion engine within the engine bay. While a sedan is shown in FIG. 1, this disclosure extends to other types of vehicles, including but not limited to trucks, vans, sport utility vehicles (SUVs), etc.

The vehicle 10 includes at least one bump stop assembly arranged within the area beneath the hood 12. In FIG. 1, the vehicle 10 includes a first bump stop assembly 14 and a second bump stop assembly 16 arranged generally on opposite sides of the vehicle 10. While two bump stop assemblies 14, 16 are shown in FIG. 1, it should be understood that the vehicle 10 may include one or more bump stop assemblies. Further, while the bump stop assemblies 14, 16 are arranged relative to a hood 12 of the vehicle 10, the bump stop assemblies 14, 16 may be used relative to other moveable flaps of the vehicle 10.

The first and second bump stop assemblies 14, 16 are configured to prevent contact between the hood 12 and other structures within the engine bay. Further, the first and second bump stop assemblies 14, 16 may be adjustable and configured to position the hood 12, when the hood 12 is in the closed position, such that the hood 12 sits flush relative to adjacent body structures of the vehicle 10, such as front quarter panels of the vehicle 10.

In addition, as will be discussed below, the first and second bump stop assemblies 14, 16 are configured to breakaway in response to an applied load condition. An applied load condition is a condition in which a relatively large load, above what is expected during normal operating conditions of the vehicle 10, is applied to the hood 12. In such conditions, the bump stop assemblies 14, 16 are configured to permit the hood 12 to absorb the relatively large applied load. In the applied load condition, the hood 12 applies a relatively large load, which is a factor of a load associated with normal closure of the hood 12, to the bump stop assemblies 14, 16. The bump stop assemblies 14, 16 are configured such that they do not fracture in response to normal closure of the hood 12. In a particular example, the bump stop assemblies 14, 16 are configured to fracture in response to an applied load at least four times the load associated with normal closure of the hood 12.

Figure 2:
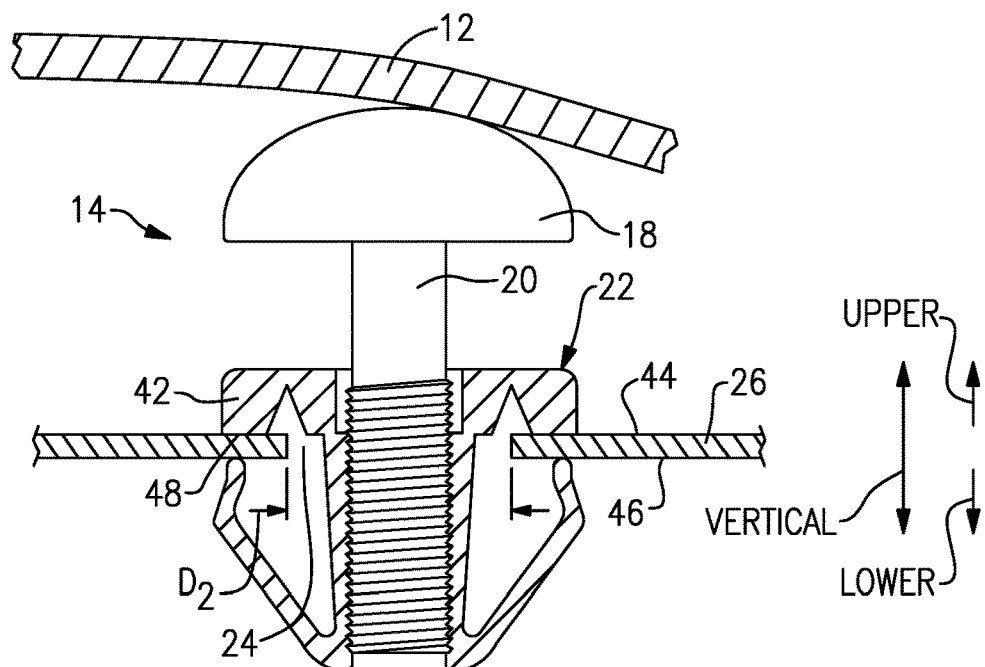
FIG. 2 is a side view of an example bump stop assembly with a base of the bump stop assembly shown in cross-section.

FIG. 2 is a cross-sectional, close-up view of the bump stop assembly 14. It should be understood that the bump stop assembly 16, and any other bump stop assemblies of the vehicle 10, are arranged substantially similar to the bump stop assembly 14.

The bump stop assembly 14 includes a head 18 configured to contact the hood 12. Specifically, in FIG. 2, the hood 12 is in the closed position and the head 18 is in direct contact with the hood 12. The bump stop assembly 14 further includes a shaft 20 connected to the head 18, and a base 22 connected to the shaft 20 and configured to support the base 22 relative to a component within, or adjacent, the engine bay. Here, the base 22 is configured to fit at least partially in an opening 24 in a panel 26 within the engine bay. The panel 26 may be provided by a piece of sheet metal or another structure, such as a casting or a composite front structure such as a plastic radiator support. The hood 12 and panel 26 may be considered part of the bump stop assembly 14. The bump stop assembly 14 may be referred to as a "bump stop." In some examples, however, only the head 18 is referred to as a "bump stop" and the remainder of the bump stop assembly 14 would be considered a support assembly, or the like.

The base 22 performs a plurality of functions, including fitting relative to the panel 26 to adequately support the remainder of the bump stop assembly 14, permitting adjustment of the head 18 (via the shaft 20) relative to the panel 26, and providing a breakaway feature in response to an applied load condition.

Figure 3:
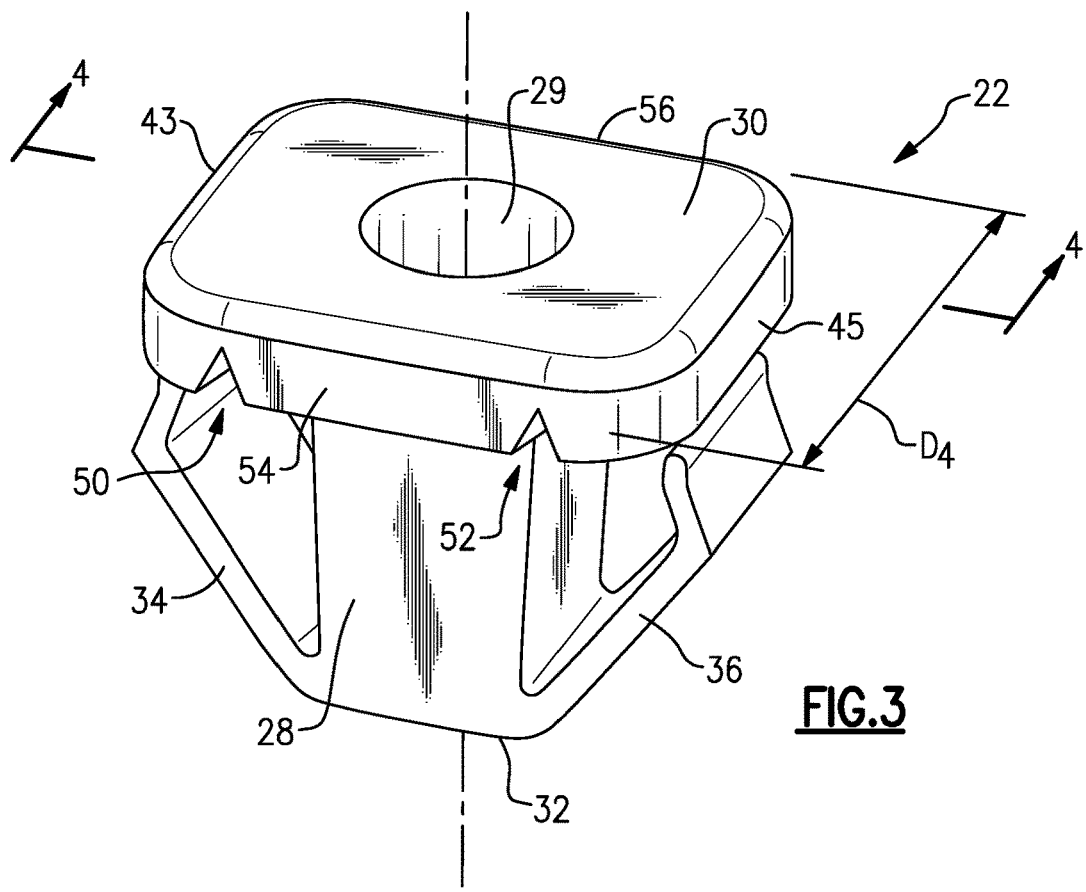
FIG. 3 is a front perspective view of the base of the bump stop assembly of FIG. 2.
Figure 4:
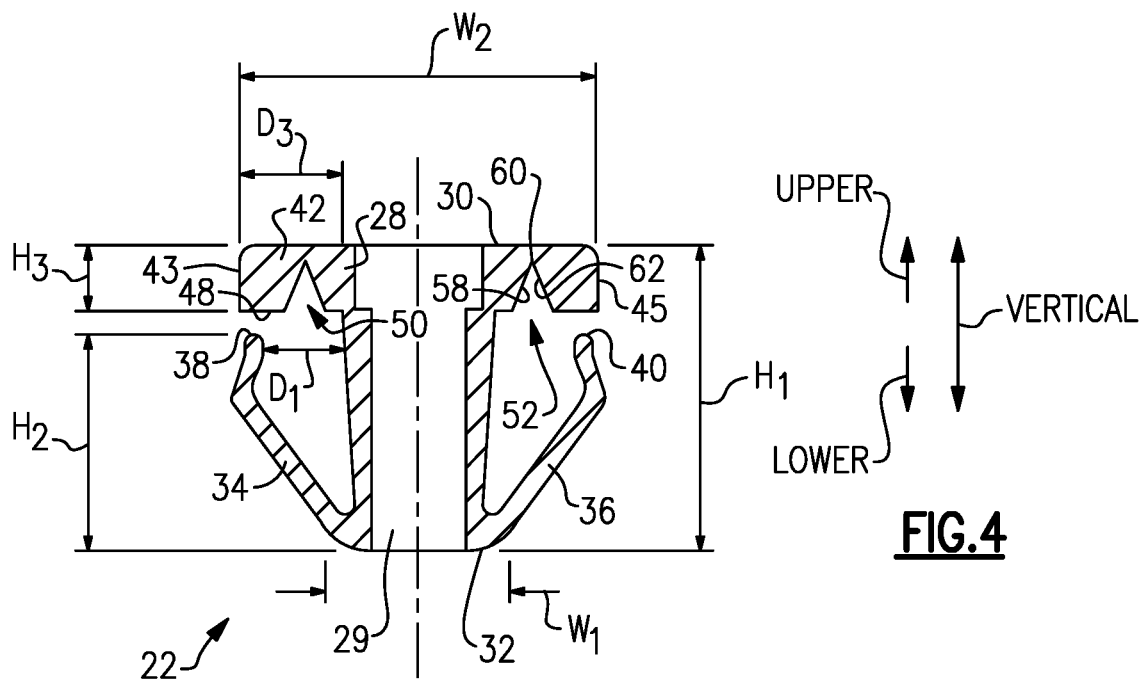
FIG. 4 is a cross-sectional view of the base of the bump stop assembly of FIG. 2, taken along line 4-4 from FIG. 3.
Figure 5:
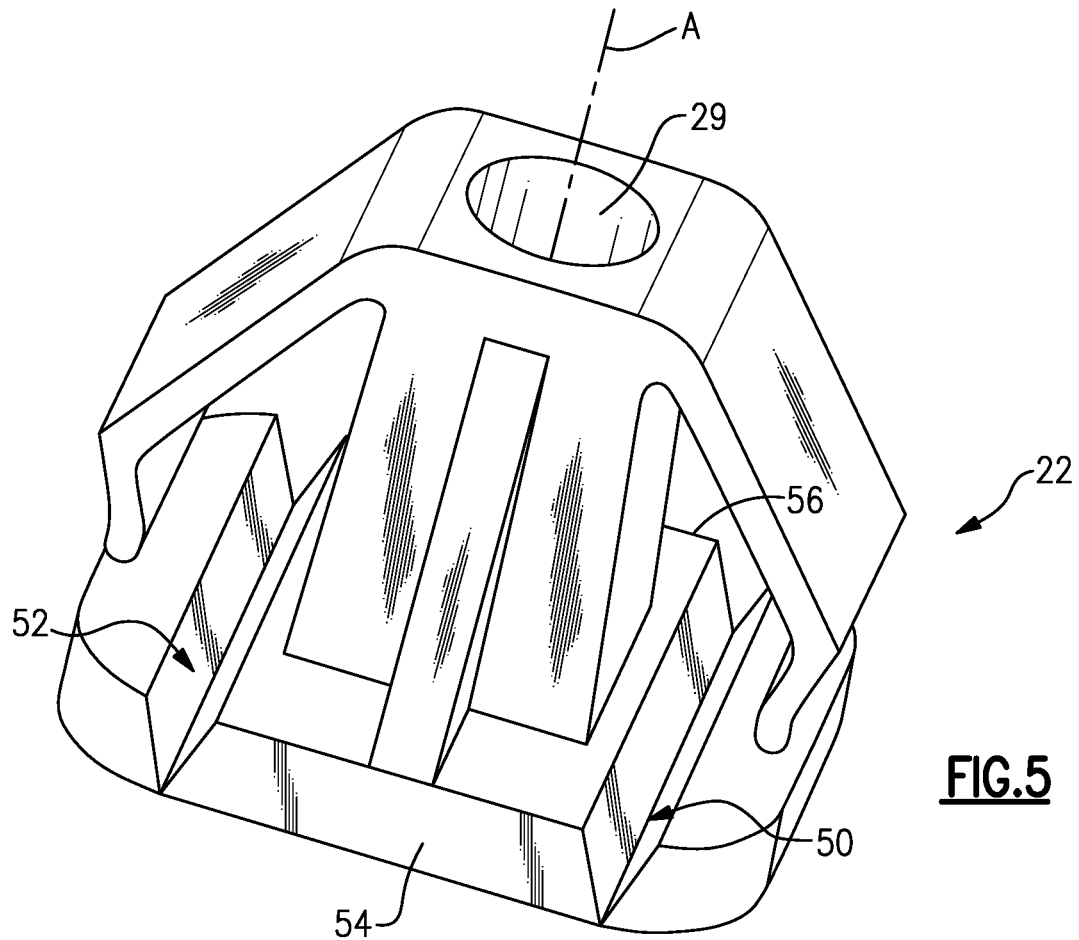
FIG. 5 is a bottom perspective view of the base of the bump stop assembly of FIG. 2.

The base 22 is shown in FIGS. 3-5 without the hood 12, the panel 26, or the other structures of the bump stop assembly 14 for ease of reference. With joint reference to those figures, the base 22 includes a main body portion 28. The main body portion 28, in this example, includes a central bore 29 extending along a central axis A of the base 22 and through the entirety of the base 22. Specifically, the central bore 29 extends through the entirety of a height $H_1$ of the base 22 from a first, upper surface 30 of the base 22 to a second, lower surface 32 of the base 22. The central bore 29 is at least partially threaded in this example and is configured to engage threads on the shaft 20. Rotating the shaft 20 relative to the central bore 29 adjusts a vertical (i.e., up and down, in the direction of gravity or relative to a position of the vehicle 10 on a ground surface) position of the head 18 relative to the panel 26, providing a desired position relative to the hood 12. The "vertical" direction is labeled in some figures, as are the "upper" and "lower" directions, for reference.

The base 22 is configured to fit relative to the opening 24 in the panel 26. The base 22, in this example, includes cantilevered arms 34, 36 ("arms 34, 36") projecting outward from opposite sides of the main body portion 28 adjacent a lower surface 32 of the base 22. Specifically, the arms 34, 36 extend from the main body portion 28 at an incline to respective free ends 38, 40 (FIG. 4) spaced-apart vertically upward from the lower surface 32 by a height $H_2$. In a relaxed position, when no lateral forces are applied to the arms 34, 36, the free ends 38, 40 are spaced-apart horizontally from the main body portion 28 by a distance $D_1$. The arms 34, 36 are configured to deflect toward the main body portion 28 to fit within the opening 24. The arms 34, 36 provide the base 22 with a tapered width dimension that gradually reduces approaching the lower surface 32. At the lower surface 32, the base has a width $W_1$ which is less than a corresponding dimension, or diameter $D_2$, of the opening 24. To this end, the opening 24 could be circular, rectangular, or another shape.

During assembly, when the base 22 is pressed into the opening 24 from above, the arms 34, 36 deflect toward one another such that the base 22 passes through the opening 24 until a flange 42 of the base 22 contacts an upper surface 44 of the panel 26. At that point, the arms 34, 36 are through the opening 24 and return to their relaxed position. In the relaxed position, the arms 34, 36, and specifically the free ends 38, 40, engage a lower surface 46 of the panel 26 and prevent movement of the base 22 relative to the panel 26 in the upward direction. The arms 34, 36 may be referred to as engagement tabs. The cantilevered arms 34, 36 provide a snap-fit connection, in one example.

During normal operating conditions, the flange 42 prevents the base 22 from falling through the opening 24. In this example, the flange 42 projects outward from the main body portion 28 by a distance $D_3$ and provides the upper surface 30 of the base 22 with a width dimension $W_2$ between opposing side walls 43, 45 greater than the diameter $D_2$ of the opening 24. The flange 42 projects downward from upper surface 30 by a height $H_3$ such that a lower surface 48 of the flange 42 is vertically spaced-apart from the free ends 38, 40 by a distance substantially equal to the thickness of the panel 26. In this way, the panel 26 fits between the lower surface 48 and the free ends 38, 40 when the base 22 is inserted into the opening 24.

The base 22, and in particular the flange 42, is configured to fracture in response to an applied load condition such that the bump stop assembly 14 moves vertically downward relative to the panel 26. Thus, when a relatively large load is applied to the hood 12, the hood 12 more readily absorbs the load.

In one example, the base 22 includes a notch configured to provide a fracture location of the base 22. The fracture location is a location at which the base 22 is weakened relative to other portions of the base 22 and will fracture, such as by cracking or breaking, before other locations in response to an applied load condition. In one example, in the applied load condition, a relatively large load is primarily applied to the hood 12, and in turn the bump stop assembly 14, in the vertically downward direction.

In FIGS. 2-5, the base 22 includes two notches 50, 52 extending parallel to one another in directions normal to the axis A. Further, the notches 50, 52 extend from a front wall 54 to a rear wall 56 of the flange 42, as perhaps best seen in FIG. 5. The front and rear walls 54, 56 project from the main body portion 28 to provide the upper surface 30 with a depth dimension $D_4$ substantially equal to the width $W_2$ in this example. In other examples, the depth dimension $D_4$ is slightly greater than a corresponding depth dimension of the opening 24 (i.e., in the direction in and out of the page, relative to FIG. 2). In either case, the main body portion 28 and flange 42 may have a rectangular perimeter shape when viewed from above or below. The main body portion 28 and flange 42 could have other shapes, such as circular shapes, however.

The notches 50, 52 are substantially V-shaped, or arrowhead-shaped, grooves in cross-section. In particular, with reference to the notch 52, the notch 52 is provided by two planar walls. Specifically, the notch 52 is provided by an inner inclined wall 58 extending upward from lower surface 48 and tilted away from the axis A to an apex 60. The notch 52 is also provided by an outer inclined wall 62 extending upward from lower surface 48 and tilted toward the axis A to the apex 60. The apex 60 is vertically below the upper surface 30. The apex 60 is also spaced-apart inward, toward the axis A, relative to the side wall 45. The notch 50 is arranged similar to the notch 52.

In response to an applied load condition, the flange 42 fractures adjacent the apexes of the notches 50, 52 because stresses in the flange 42 concentrate at the notches 50, 52. In turn, the flange 42 fractures at locations vertically above the apexes of the notches 50, 52. The fracture does not spread or propagate significantly within the base 22. Portions of the flange 42 outward of the apexes separate from the remainder of the base 22, which permits the central portion of the base 22, and in turn the remainder of the bump stop assembly 14, to fall downward at least partially through the opening 24.

To this end, the apexes of the notches 50, 52 are vertically above a perimeter of the opening 24. Alternatively, the apexes of the notches 50, 52 are spaced-apart inward of the perimeter of the opening.

The base 22, in one example, is provided by a single, integral component. In this example, the base 22 does not have any joints, seams, or fasteners holding the base 22 together that would otherwise be present in multi-piece components. The base 22 may be integrally formed using known manufacturing techniques, such as molding or casting. The base 22 may be made of a metallic or plastic material, as examples.

Figure 6:
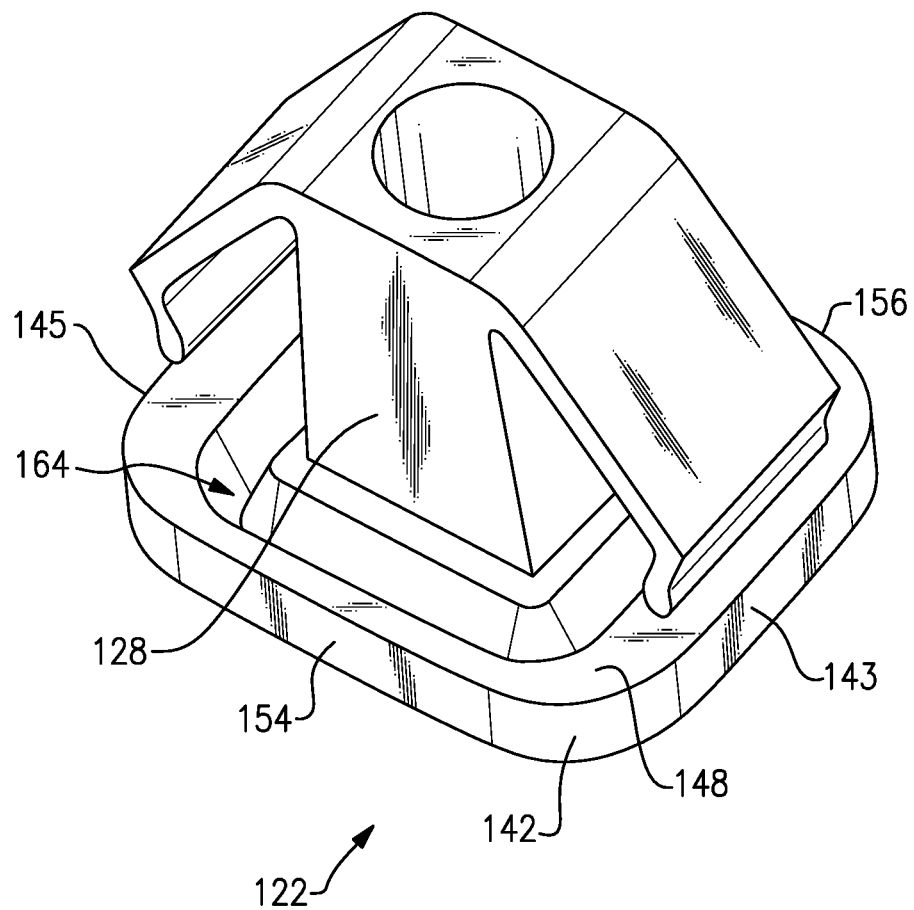
FIG. 6 is a bottom perspective view of a second example base of a bump stop assembly.

While in FIGS. 2-5, the base 22 includes two notches 50, 52, this disclosure extends to bases with one or more notches. FIG. 6 illustrates another example base 122 which corresponds substantially to the base 22, with like parts having like reference numerals preappended with a "1."

In FIG. 6, the base 122 includes a single notch 164 which circumscribes the main body portion 128. The notch 164 is provided by a single, continuous V-shaped groove, which is provided by two inclined, planar walls extending from a lower surface 148 of a flange 142. In other words, the notch 164 resembles the notches 50, 52 in cross-section. The notch 164 includes four segments, with approximate right angles between each segment. The four segments of the notch 164 extend parallel to a corresponding one of the side walls 143, 145 or front and rear walls 154, 156. The notch 164 provides a continuous fracture location about the axis A, which may increase the ease of the central portion of the base 122 falling through the opening 24 in an applied load condition.

While in FIGS. 2-6, the notches 50, 52, 164 are open facing the panel 26 (i.e., in the downward direction), this disclosure extends to bases that include one or more notches open facing the hood 12 (i.e., the upward direction). In particular, FIG. 7 illustrates another example base 222, which corresponds to the aforementioned bases 22, 122, with like parts having reference numerals corresponding to those of the bases 22, 122 with a preappended "2."

The base 222 includes two notches 266, 268, which are formed as V-shaped grooves, open facing the hood 12, or the vertically upward direction. In particular, with reference to the notch 266, the notch 266 is provided by two planar walls. Specifically, the notch 266 is provided by an inner inclined wall 270 extending downward from the upper surface 230 and tilted away from the axis A to an apex 272. The notch 266 is also provided by an outer inclined wall 274 extending downward from the upper surface 230 and tilted toward the axis A to the apex 272. The apex 272 is vertically below the upper surface 230 and vertically above the lower surface 248. The notch 268 is arranged similar to the notch 266. The notches 266, 268 extend in directions parallel to one another, normal to the axis A, from a front surface to a rear surface of the flange 242, similar to FIGS. 2-5.

Figure 7:
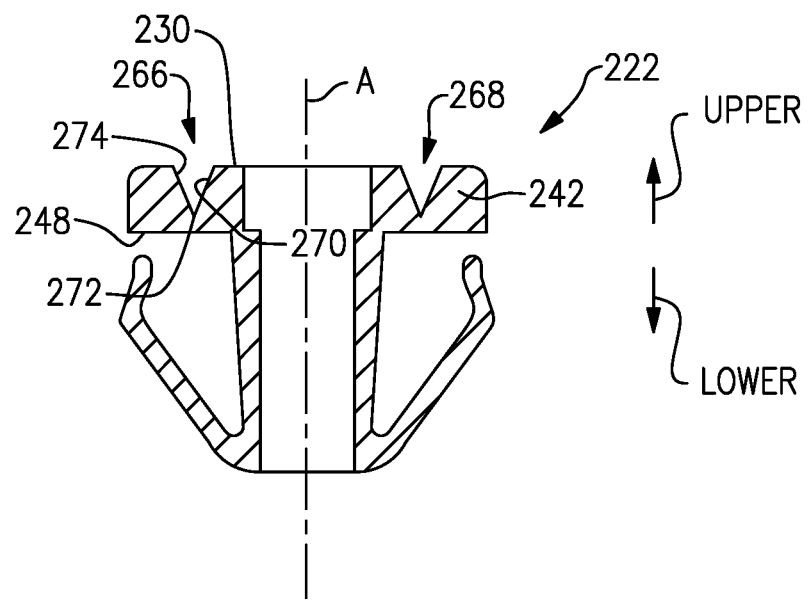
FIG. 7 is a cross-sectional view of a third example base of a bump stop assembly.
Figure 8:
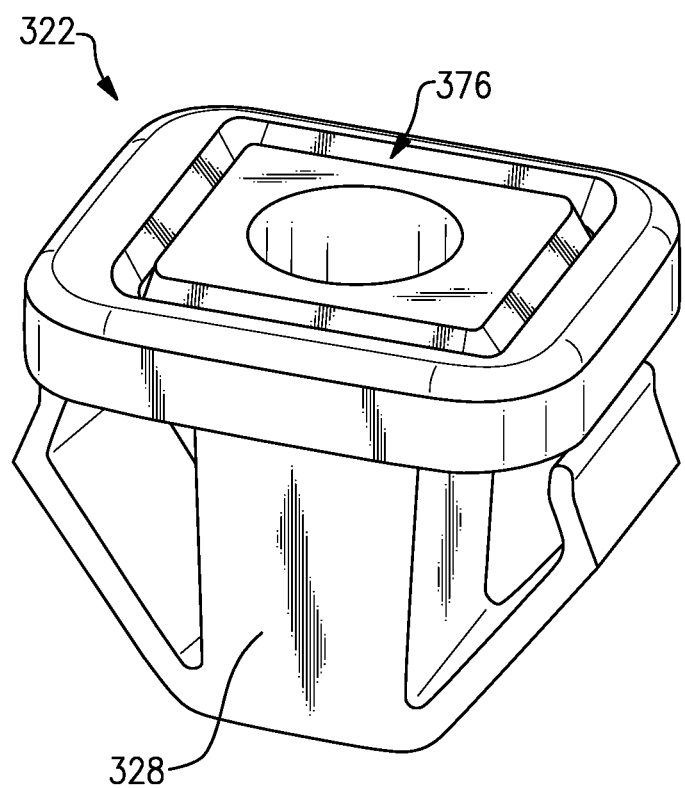
FIG. 8 is a front perspective view of a fourth example base of a bump stop assembly.

FIG. 8 illustrates another embodiment in which the base 322, which has like parts to the aforementioned bases and includes corresponding reference numerals preappended with a "3," has a notch 376 open toward the hood 12, as in FIG. 7, and which circumscribes the main body portion 328, as in FIG. 6.

Directional terms such as "vertical," "upper," "lower," "upward," "downward," "inward," "outward," etc., are used herein for purposes of explanation and with reference to the orientation of components illustrated in the drawings. Such directional terms should not be considered limiting. Further, it should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A bump stop assembly for a motor vehicle, comprising:
   a head configured to contact a hood of the motor vehicle when the hood is closed;
   a shaft; and
   a base configured to fit in an opening in a panel of the motor vehicle, wherein the shaft supports the head relative to the base, and wherein the base includes a notch configured to provide a fracture location of the base.

2. The assembly as recited in claim 1, wherein the notch is a V-shaped groove.

3. The assembly as recited in claim 1, wherein the notch is open facing the hood.

4. The assembly as recited in claim 1, wherein the notch is open facing the panel.

5. The assembly as recited in claim 1, wherein:
   the base includes a main body portion and a flange, and
   the notch is in the flange.

6. The assembly as recited in claim 5, wherein:
   in a normal operating condition, the flange is configured to prevent movement of the bump stop assembly relative to the panel in a downward direction, and
   in an applied load condition, the flange is configured to fracture adjacent the notch and permit movement of the bump stop assembly relative to the panel in the downward direction.

7. The assembly as recited in claim 5, wherein the notch circumscribes a main body portion of the base.

8. The assembly as recited in claim 5, wherein the flange includes two notches on opposite sides of a main body portion of the base.

9. The assembly as recited in claim 5, wherein the notch includes an apex arranged vertically above a perimeter of the opening in the panel.

10. The assembly as recited in claim 5, wherein the notch includes an apex arranged inward of a perimeter of the opening in the panel.

11. The assembly as recited in claim 1, wherein the base includes two cantilevered arms projecting from opposite sides of a main body portion of the base.

12. The assembly as recited in claim 1, wherein:
    the base includes a central bore,
    the central bore is at least partially threaded,
    the shaft is at least partially threaded and engages threads of the central bore such that rotation of the shaft adjusts a vertical position of the head relative to the panel.

13. A motor vehicle, comprising:
    a hood configured to open and close relative to an area of the motor vehicle;
    a panel within the area;
    a bump stop assembly within the area, comprising:
        a head configured to contact the hood when the hood is closed;
        a shaft; and
        a base configured to fit in an opening in the panel, wherein the shaft supports the head relative to the base, and wherein the base includes a notch configured to provide a fracture location of the base.

14. The motor vehicle as recited in claim 13, wherein the area is an engine bay of the motor vehicle.

15. The motor vehicle as recited in claim 13, wherein the notch is a V-shaped groove.

16. The motor vehicle as recited in claim 13, wherein the notch is either open facing the hood or the panel.

17. The motor vehicle as recited in claim 13, wherein:
    the base includes a main body portion and a flange, and
    the notch is in the flange.

18. The motor vehicle as recited in claim 17, wherein:
    in a normal operating condition, the flange is configured to prevent movement of the bump stop assembly relative to the panel in a downward direction, and
    in an applied load condition, the flange is configured to fracture adjacent the notch and permit movement of the bump stop assembly relative to the panel in the downward direction.

19. The motor vehicle as recited in claim 17, wherein the notch circumscribes a main body portion of the base.

20. The motor vehicle as recited in claim 17, wherein the flange includes two notches on opposite sides of a main body portion of the base.

* * * * *